United States Patent [19]
McNair

[11] Patent Number: 5,206,906
[45] Date of Patent: Apr. 27, 1993

[54] VIDEO SCRAMBLING SYSTEM

[75] Inventor: Bruce E. McNair, Holmdel, N.J.

[73] Assignee: AT&T Bell Laboratories, Murray Hill, N.J.

[21] Appl. No.: 816,420

[22] Filed: Dec. 31, 1991

[51] Int. Cl.⁵ .................. H04N 7/167; H04K 1/06
[52] U.S. Cl. ................................ 380/14; 380/20; 380/36
[58] Field of Search .................. 380/20, 10, 36, 14

[56] References Cited

U.S. PATENT DOCUMENTS

| | | | |
|---|---|---|---|
| 2,952,735 | 9/1960 | Weiss | 380/20 |
| 3,789,131 | 1/1974 | Harney | 380/20 |
| 3,914,534 | 10/1975 | Forbes | 380/20 |
| 4,100,374 | 7/1978 | Jayant et al. | 380/36 |
| 4,130,833 | 12/1978 | Chomet | 380/20 |
| 4,232,193 | 11/1980 | Gerard | 380/36 |
| 4,405,942 | 9/1983 | Block et al. | 380/14 |
| 4,535,355 | 8/1985 | Arn et al. | 380/20 |

*Primary Examiner*—Gilberto Barrón, Jr.
*Attorney, Agent, or Firm*—R. D. Slusky; E. J. Rosenthal

[57] ABSTRACT

At least one new video signal is created by using portions taken from each signal of a plurality of original video signals to create at least one new video signal, with the sequencing of the assignments of the particular portions from any of the original video signals to any particular ones of the new video signals, or the positions therein, being the output of a cryptographic function. A cryptographic function is a function that employs a cryptographic algorithm to supply as an output an enciphered version of the values of at least one of its inputs. Because the portion assignment sequence is the output of a cryptographic function, the resulting arrangements of the portions from the original video signals within the new video signals appear random to a viewer of the new video signals. Thus, the information content of the original video signals is not intelligible when viewing the new video signals, either individually or in any combination. Moreover, one who does not know either which encryption algorithm is used as part of the cryptographic function, or any of the controlling parameters of the algorithm, can not determine the cryptographic function nor reconstruct any of the original video signals from the new video signals. Descramblers may be employed to reconstruct any of the original video signals from the new video signals by selecting only those portions that made up a particular original signal from among all of the portions in all of the new video signals.

38 Claims, 3 Drawing Sheets

VIDEO SCRAMBLING SYSTEM

TECHNICAL FIELD

This invention relates to the security of video signals and, more particularly, to a scrambling technique for making video signals secure by rendering them unintelligible to unauthorized viewers.

BACKGROUND OF THE INVENTION

Prior art video scrambling systems typically operate on a single video signal and perform a repetitive operation upon that signal. To render the information content of the signal unintelligible by an unauthorized individual, reversible additions, deletions or modifications are made to the video signal. Such prior art systems include those that suppress horizontal video synchronization, modify individual picture scan lines, alter color information contained in the picture or add an interfering carrier signal. Disadvantageously, however, methods of defeating these prior art scrambling systems are known to those who would wish to view the scrambled signals and, furthermore, equipment that can be used to defeat these systems is inexpensive and readily available.

SUMMARY OF THE INVENTION

The limitations of prior art video scrambling systems are overcome, in accordance with the principles of the invention, by using portions taken from each signal of a plurality of original video signals to create at least one new video signal, with the sequencing of the assignments of the particular portions from any of the original video signals to any particular ones of the new video signals, or the positions therein, being the output of a cryptographic function. A cryptographic function is a function that employs a cryptographic algorithm to supply as an output an enciphered version of the values of at least one of its inputs. Because the portion assignment sequence is the output of a cryptographic function, the resulting arrangements of the portions from the original video signals within the new video signals appear random to a viewer of the new video signals. Thus, the information content of the original video signals is not intelligible when viewing the new video signals, either individually or in any combination. Moreover, one who does not know either which encryption algorithm is used as part of the cryptographic function, or any of the controlling parameters of the algorithm, can not determine the cryptographic function nor reconstruct any of the original video signals from the new video signals.

In a preferred embodiment of the invention, the portions of the video signals that are used are frames, and the output of the cryptographic function determines the sequence in which the frames of the original video signals are applied as outputs to a plurality of communications channels, equal in number to the number of original video signals, so as to create the new video signals.

In accordance with an aspect of the invention, for a descrambler which is used to reconstruct any of the original video signals from the new video signals, only those portions that made up a particular original signal must be selected from among all of the portions in all of the new video signals. These selected portions must then be supplied as an output in the proper sequence. For reconstruction to be successful, it is required that the selection and supplying processes employed during the reconstruction be the inverse of, and synchronized in state with, the cryptographic function that was employed for developing the portion assignment sequence when the new video signals were generated.

DETAILED DESCRIPTION

Figure 1:
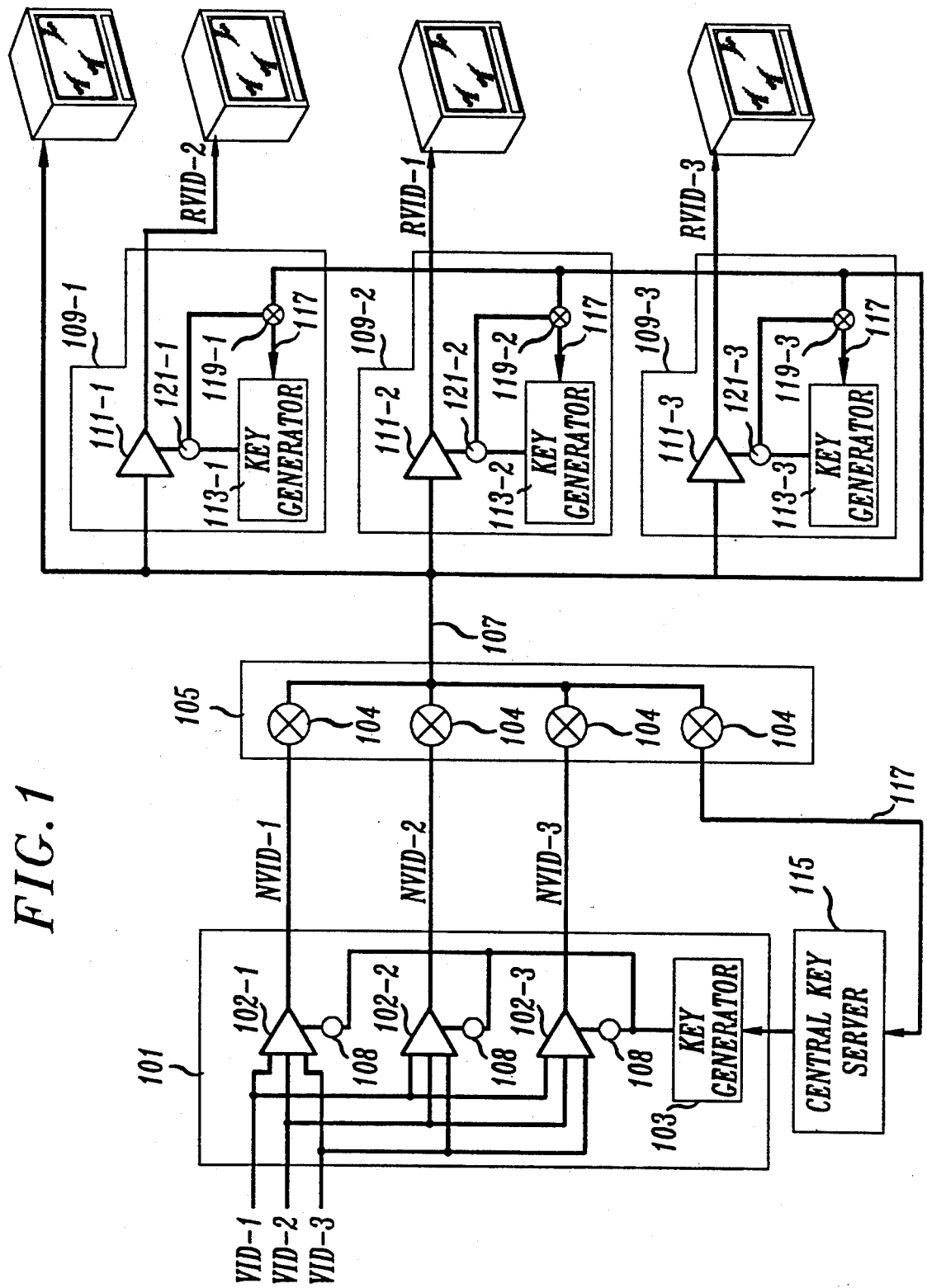
FIG. 1 shows an exemplary cryptographic video scrambler embodying the principles of the invention.

Shown in FIG. 1 is exemplary cryptographic video scrambler 101 embodying the principles of the invention. Scrambler 101 includes video selectors 102, designated as video selectors 102-1 through 102-3, key generator 103 and controllers 108. Three different original video signals VID, designated VID-1, VID-2, and VID-3, are supplied as inputs to scrambler 101. Signals VID are typically video broadcasts, private video signals, or dummy filler video signals.

For each video frame period, each of video selectors 102 selects a frame from one of signals VID-1, VID-2, or VID-3, and supplies that frame as an output. The supplying of the selected frames as outputs of the video selectors causes the creation of new video signals NVID-1, NVID-2 and NVID-3—collectively signals NVID. Each of controllers 108 determines the particular one of signals VID that its respective associated one of video selectors 102 selects. In accordance with the principles of the invention, each of controllers 108 employs a cryptographic function in making its determination. A cryptographic function is a function that employs a cryptographic algorithm to supply as an output an enciphered version of the values of at least one of its inputs. It is noted, and well understood in the art, that the enciphered output may be identical with the output of the cryptographic algorithm employed.

To be able to reconstruct any of signals VID when given signals NVID, it is necessary that, at each point in time, the current frame of each of signals VID be supplied as an output by at least one of video selectors 102. To this end, and toward the end of insuring that signals VID are not intelligible to a viewer of signals NVID, in accordance with an aspect of the invention, a representation of the position within scrambler 101 of each of video selectors 102 is enciphered by a cryptographic function. Each enciphered position representation is used as a selection indicator which determines the one of signals VID that is to be supplied as an output by the respective one of video selectors 102. The reference numeral suffix of each of video selectors 102 is employed to represent its position. The position so represented may be a physical position or a logical position. The specific one of signals VID that is supplied as an output during any frame period by a particular one of video selectors 102, is the one whose label suffix has the same value, for that frame period, as the value of the enciphered position representation of the particular one of video selectors 102.

Thus, in the exemplary embodiment shown in FIG. 1, for each frame period, each of controllers 108 determines its selection indicator by combining the reference numeral suffix of its associated one of video selectors 102 and the current number in a pseudo-random sequence of numbers supplied by key generator 103. The pseudo-random sequence of numbers is developed according to a cryptographic algorithm, with one number being developed for each frame period. Such a combining is an exemplary cryptographic function, since an enciphered version of the position representation is thereby generated. Furthermore, unique frame selection indicators result from the combining and, therefore, a frame of each of the different ones of signals VID is supplied as an output, during each frame period, by each of video selectors 102.

Controllers 108 perform the above-described cryptographic position representation enciphering and supply the resulting selection indicators to their respective ones of video selectors 102. In turn, each of video selectors 102 selects the one of signals VID that has a label suffix the value of which is the same as the value of the selection indicator. The frames of the selected ones of signals VID are supplied as outputs by the respective ones of video selectors 102, thereby creating signals NVID.

Key generator 103 is a pseudo-random sequence generator of a type that is well known in the art. As such, it supplies, as an output, a sequence of numbers generated according to a cryptographic algorithm. Each number is typically represented by a plurality of bits all of which or, alternatively, some subset of which are used by controllers 108. An essential characteristic of a sequence of numbers generated according to a cryptographic algorithm is that the present and future values of the sequence can not be predicted if the only knowledge available to the predictor is what the prior values of the sequence have been. This essential characteristic is also true for the enciphered output of a cryptographic function. However, if the controlling parameters for a cryptographic algorithm are available to the predictor, the future values of the pseudo-random sequence generated by the algorithm can be predicted. Likewise, if the controlling parameters of the cryptographic algorithm employed by the cryptographic function are known, and if the input sequence is known, then the future values of the enciphered output can be predicted. As is well known by those skilled in the art, the controlling parameters of cryptographic algorithms are the key variable and the present internal state. An exemplary key generator 103 would employ the data encryption standard (DES) as its cryptographic algorithm.

In an exemplary embodiment of the cryptographic enciphering and frame selection, on a per frame basis, key generator 103 supplies the same number, 0, 1 or 2, which is generated according to its cryptographic algorithm, e.g., DES, to each of controllers 108. Each of controllers 108 then adds the value of the output from key generator 103 to its reference numeral suffix, using a modular arithmetic with modulus 3. Such an addition operation is an exemplary form of the above-mentioned combining, and, because one of the inputs to the addition is generated according to a cryptographic algorithm, the overall process is a cryptographic function. The numbers resulting from the modulo 3 arithmetic, which are the enciphered positions for use as selection indicators, are supplied by controllers 108 to their respective ones of video selectors 102. In turn, each of video selectors 102 selects the frame of the one of signals VID that has the same label suffix value as the value of the selection indicator it receives.

Figure 2:
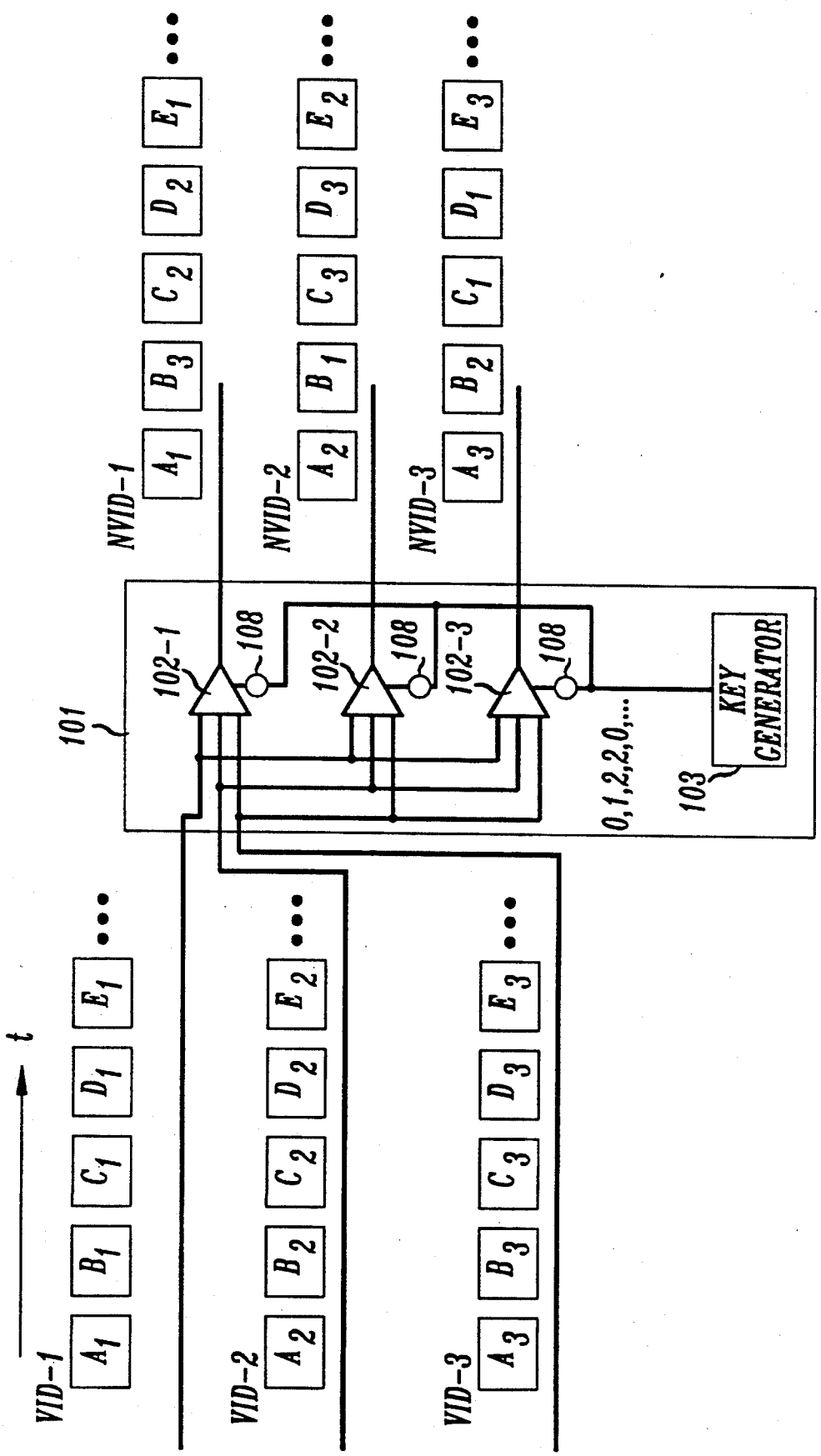
FIG. 2 shows a diagram to help explain the operation of the cryptographic video scrambler shown in FIG. 1.

Shown in FIG. 2 is a diagram to help explain the operation of scrambler 101. As shown, signals VID are comprised of frames, each frame spanning in time one frame period. Each different letter designation in the frame labels designates a different frame time period with the frames being received by scrambler 101 in the order A, B, C, D, E... Thus, scrambler 101 receives all frames having the same letter designation at the same time. The subscript in the label of each frame indicates the one of signals VID in which the frame was received by scrambler 101. Therefore, all frames of signal VID-1 have the subscript 1, all frames of signal VID-2 have the subscript 2, and all frames of signal VID-3 have the subscript 3.

As also shown in FIG. 2 the pseudo-random number sequence supplied by key generator 103 begins with the numbers 0, 1, 2, 2, 0, which are respectively supplied for each of the five frame time periods A through E. As shown, all the frames of signals VID, at frame time period A, pass through scrambler 101 as if each of signals VID were directly connected to the one of signals NVID that has the same numeric suffix. This is because the random number supplied as an output by key generator 103, for frame time period A, is a 0 and the modulo 3 sum of each frame number designation with 0 is, of course, that same number. Similar, since the output of key generator 103 for frame time period B is a 1, frames $B_1$, $B_2$ and $B_3$ are supplied to signals NVID-2, NVID-3 and NVID-1, respectively. The frames arriving at times C, D, and E are mapped from signals VID to signals NVID similarly. In summary, then, the same frames that comprise signals VID also comprise signals NVID, but are scrambled among signals NVID.

Returning to FIG. 1, modulators 104 modulate each of signals NVID onto a respective different carrier frequency. Then, video multiplexing circuit 105, of which modulators 104 are elements, combines the modulated signals and supplies the resulting frequency-multiplexed signal to communications channel 107. In a preferred embodiment, communications channel 107 is a cable television distribution system that distributes the scrambled video signals to the locations of all the subscribers of the cable system, including those having descrambling equipment 109—referred to herein as descramblers 109.

Descramblers 109, designated herein as descramblers 109-1 through 109-3 each receives as an input the multiplexed modulated scrambled video signals NVID. Each of descramblers 109 includes one of demodulators 111, one of key generators 113, one of control demodulators 119 and one of controllers 121. Demodulators 111, because they are capable of demodulating a video signal from a set of predetermined carrier frequencies, belong to the well-known class of frequency-agile demodulators. Each of demodulators 111 supplies as an output, at any time, the demodulated signal of the one of signals NVID that is selected by its associated one of controllers 121.

In accordance with the principles of the invention, each of controllers 121 employs a cryptographic function to determine the frequency of the one of signals NVID to be demodulated by its respective associated one of demodulators 111. In the exemplary embodiment shown, each of controllers 121 determines for each frame period, the frequency of the actual one of signals NVID to be demodulated by its associated one of demodulators 111. The determination is made as a function of the output of the respective one of key generators 113 and a predetermined session number supplied by central key server 115.

As an example of the descrambling process, it is assumed that a subscriber associated with one of descramblers 109 desires a session of viewing a particular one of signals VID. Such a session might correspond to the reception of a pay-per-view movie. Each of signals VID is associated with a session number that is the same as its label suffix. Thus, in the exemplary embodiment shown in FIG. 1, the session number ranges from 1 to 3. For each viewing session, if the subscriber has been authorized to receive the particular one of signals VID, central key server 115 supplies the appropriate session number to the subscriber's one of descrambler 109, using signaling techniques described below. As an example, a subscriber may request and be authorized to receive signal VID-2, which is the pay-per-view movie, if she has paid the required fee. A "2" would be supplied by central key server 115 as the session number.

In the exemplary embodiment shown, each of key generators 113 supplies for each frame period a number, 0, 1 or 2, that is a part of a pseudo-random sequence of numbers generated according to a cryptographic algorithm. On a per frame basis, each of controllers 121 adds the value supplied by its respective one of key generators 113 to the session number that it received from central key server 115, using a modular arithmetic with modulus 3. Each resulting value is supplied to the respective one of demodulators 111, which demodulates the frequency of the one of signals NVID having the same label suffix.

Each of descramblers 109 can reconstruct the one of original video signals VID that has the same label suffix as its current session number if, in accordance with an aspect of the invention, its associated one of key generators 113 is synchronized with key generator 103. In order to accomplish the necessary synchronization, a message requesting access to the particular one of signals VID is sent, via a mechanism described below, from the subscriber's one of descramblers 109 to central key server 115. If central key server 115 determines that the subscriber is authorized to view the requested one of signals VID, it supplies to the subscriber's one of key generators 113 the current encryption key and the present internal state of encryption key generator 103. Upon receipt of the current encryption key and present internal state, the subscriber's one of key generators 113 can immediately synchronize with the current state of key generator 103. Once synchronized with key generator 103, the associated one of video descramblers 109 can decode the particular one of signals VID, even if that one of signals VID was already being transmitted and encrypted for a period of time. If considerations of transmission delay make it necessary, those skilled in the art will recognize that the current encryption key and the present internal state supplied by key generator 103 may be those for an appropriate predetermined frame in the future.

As an additional security measure, it may also be necessary for encryption key generator 103 to transmit to the subscriber's one of key generators 113 an identification of the particular encryption algorithm that is being employed by scrambler 101. Encryption algorithms are well known and need not be described herein.

Figure 3:
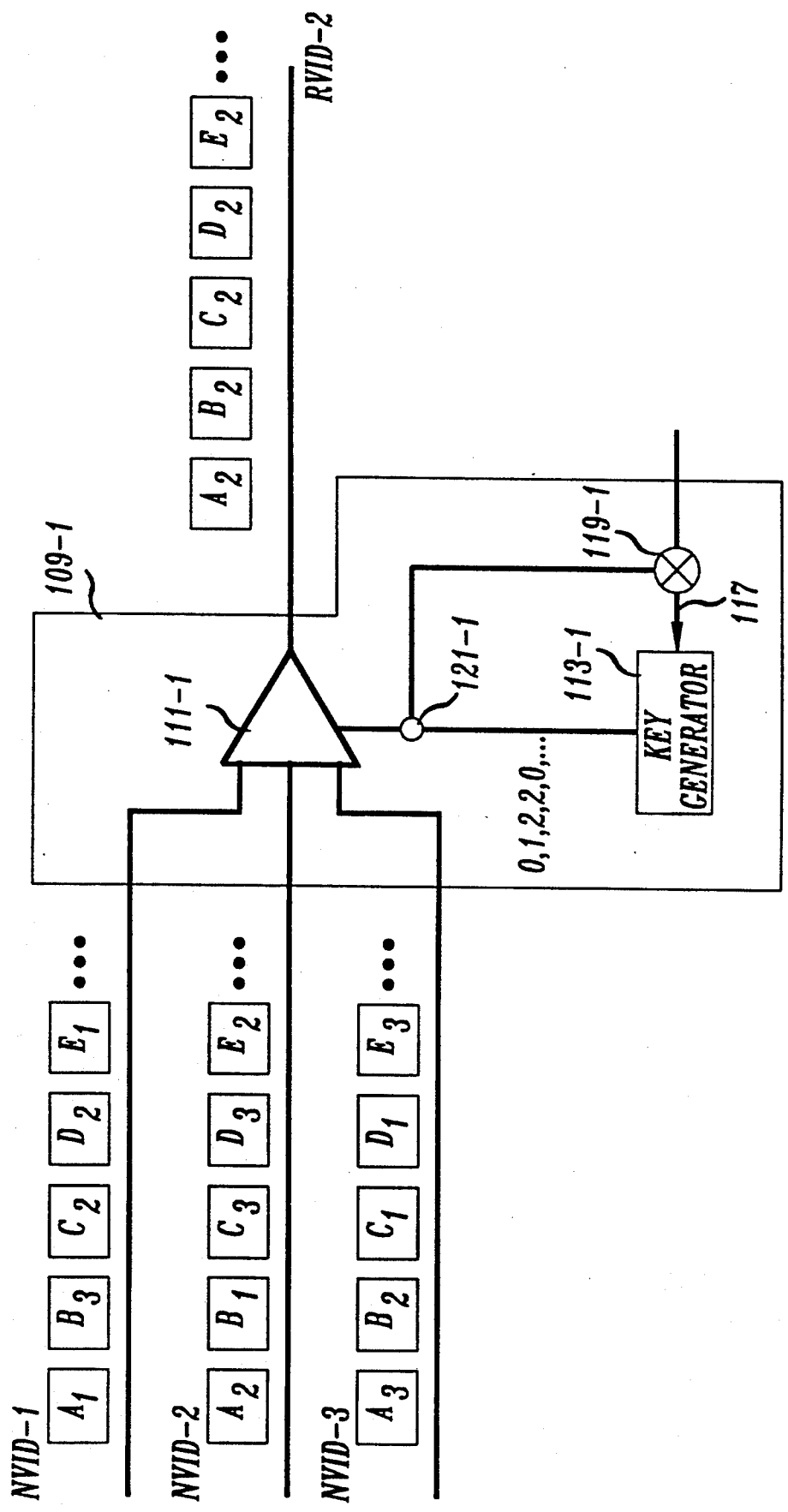
FIG. 3 shows how the video signals scrambled by the scrambler of FIG. 1 are descrambled.

Shown in FIG. 3 is descrambler 109-1 that is being supplied with the particular exemplary frames of signals NVID that are shown in FIG. 2. For clarity, each of signals NVID is shown separately, in its own channel, rather than as a part of the single multiplexed signal supplied as an output by multiplexer 105. The output of key generator 113-1, has been synchronized with, and is identical to, that of key generator 103 of FIG. 2, in accordance with an aspect of the invention. As noted above, the particular session number supplied by the subscriber is "2". This session number indicates that signal VID-2 (FIG. 2) should be reconstructed. Signal RVID-2 is formed at the output of demodulator 111-1, according to the descrambling process described above, and supplied as the output of descrambler 109-1. Signal RVID-2 is the reconstructed version of signal VID-2, and, indeed, it is identical with signal VID-2.

To insure that the encryption key will not be readily available to unauthorized parties, it should be transmitted between key generator 103 and each of key generators 113 in a secure fashion. This may be accomplished by using a key management technique such as the one specified in the ANSI X9.17 standard. Naturally, other techniques that are well known in the art may also be employed.

The connections between descramblers 109 and central key server 115 may be actualized by employing signaling channel 117. Signaling channel 117 is shared by all of descramblers 109, and it is modulated and multiplexed onto channel 107 along with video signals NVID. Control demodulators 119 demodulate the signals carried over signaling channel 117. Control demodulators 119 are fixed frequency demodulators.

In the above described embodiment of the invention, the switching between the video signals, either the original ones or the scrambled ones, is performed on a per frame basis. Therefore, it is recommended that the switching between any video signals be performed at the beginning of the video frame during the so-called "vertical retrace interval". By so switching, any transients generated as a result of the switching will come into existence when video information is not being transmitted. It may interfere with closed captioning, however, which is supplied during vertical retrace. It is noted that the switching of the outputs of selectors 102 need not occur on a per frame basis, but instead could take place on a multi-frame-by-multi-frame basis. In such an embodiment, it is also recommended that switching be performed during the "vertical retrace interval". In a further alternative embodiment, the switching between the video signals could be accomplished at the beginning of a video scan line, thereby resulting in switching on a line-(or multi-line)-by-line basis. Another convenient place to perform the switching is on a field boundary, thereby yielding switching on a field-by-field basis.

If information is to be transmitted on only one of signals VID at a particular time while the others of signals VID would remain idle, it is highly desirable that filler video signals be supplied to at least one of the remaining inputs of scrambler 101. Indeed, to achieve best results, some type of video signal should always be supplied to such each input of scrambler 101. The best types of filler video signals are those that would tend to capture the attention of a person viewing one of signals NVID containing as a component some of the information of the filler signal. Recommended filler signals include signals having at least one of the following characteristics: high contrast, slow movement or readily identified patterns. Several exemplary filler signals are: a checkerboard pattern, a color bar test pattern, or slowly moving line segments.

It will be obvious to one skilled in that art that the above described techniques are not limited to applications with video signals. They are appropriate for use with any signals that are defined to have an identical format. It is also noted that three video signals were employed merely for ease of exposition and clarity. Three does not limit the scope of the invention in any manner. Furthermore, those skilled in the art will immediately recognize how to apply the principles of the invention using as few as two signals or as many as they care to employ. Moreover, those skilled in the art will also be able to apply the above described techniques to scramble the sequence of the frames within even a single signal.

Those skilled in the art will also be able to devise other cryptographic functions that insure that each portion of each of the input signals is mapped to at least one portion of one of the scrambled signals.

Note that channel 107 can be any type of transmission system that can support multiple channels. Such systems are well known in the art and include: coaxial cable, radio and fiber-optics-based systems. Typically, such systems employ time division, frequency division, or space division multiplexing. Furthermore, video multiplexing circuit 105 need not employ modulators 104. Instead, it may include elements adapted to multiplex the scrambled video signals in a fashion that best makes use of the multiple channel nature of a particular embodiment of channel 107.

The functionality of controllers 108 may also be consolidated into a single, centralized controller. For each successive frame period, an exemplary embodiment of such a centralized controller would generate a signal having N elements arranged according to an order that was determined cryptographically. The positions within the order are each associated with both a number that corresponds to a different respective one of signals VID to be scrambled and a different respective one of selectors 102. Therefore, the value of N is the same as the number of signals VID to be scrambled. The value of each element identifies a different respective one of the scrambled output signals NVID. For each frame period, the centralized controller supplies to those of selectors 102 that are associated with a position in the ordering of the elements the particular element that corresponds to its respective associated position. The ones of selectors 102 that receive an element select and supply as an output the frame of the one of signals VID that have a label suffix equal in value to the element, thereby creating signals NVID.

An advantage of video scrambler 101 is that if signals VID are all video signals having an identical format, then the resulting scrambled signals NVID are all video signals having the identical format. NTSC, PAL and SECAM are exemplary standardized video signal formats. A video signal having such a standardized format that undergoes scrambling by cryptographic video scrambler 101 simultaneously has its audio content scrambled and thereby rendered unintelligible. Successful reconstruction of the video signal results in a successful reconstruction of the audio content as well, despite the possible introduction of unnoticeable small gaps therein. A further advantage is that the system can operate with prior art types of scrambled video signals as inputs, provided that the vertical synchronization of the signals remains unaltered.

I claim:

1. Apparatus for use in cryptographically scrambling at least three signals to obtain an output signal, each of said at least three signals being divided into predetermined portions, the apparatus comprising:
    means for generating a selection signal cryptographically, said means for generating employing a cryptographic algorithm responsive to a set of controlling parameters for generating said selection signal;
    means responsive to said selection signal for selecting portions from each signal of said at least three signals to obtain said output signal; and
    means for developing and updating said set of controlling parameters and for securely delivering said controlling parameters, out-of-band with respect to said output signal and upon request, to a plurality of locations, one of said locations being said means for generating.

2. The invention as described in claim 1 wherein each signal of said plurality is a video signal.

3. The invention as described in claim 2 wherein said portions are frames of said video signals.

4. The invention as described in claim 2 wherein said portions are fields of said video signals.

5. The invention as described in claim 2 wherein said portions are lines of said video signals.

6. Apparatus for use in creating an output signal from at least three input signals that are each divided into predetermined portions, the apparatus comprising:
    means for generating a pseudo-random number sequence said pseudo-random number sequence being generated in response to a set of controlling parameters;
    means responsive to said pseudo-random number sequence for combining portions from each of said at least three signals to create said output signal;
    means for receiving requests for said set of controlling parameters from at least one remote location at which means for reconstructing at least one of said at least three signals is located; and
    means for securely transmitting said set of controlling parameters, out-of-band with respect to said output signal to said remote location in response to a received request.

7. Apparatus having at least one input and an output for use in processing at least three signals, each of said at least three signals being divided into a plurality of portions, each of said portions having an identical format and being delineated in time by portion boundaries, each portion in each of said signals having its portion boundaries aligned with the portion boundaries of a portion in each of the other at least three signals, one portion per signal being received by said apparatus at any instant, the apparatus comprising:
    a cryptographic key generator responsive to a set of controlling parameters for supplying a pseudo-random number sequence, at least one number of said sequence being supplied each time a different portion begins to be received from a predetermined one of said at least three signals by said apparatus;
    means for creating an output signal by supplying as an output portions selected from said portions received by said apparatus; and
    means responsive to said pseudo-random number sequence for selecting which of the portions of said at least three signals are supplied as the output of said means for creating;
    means for receiving requests for said set of controlling parameters from at least one remote location at which means for reconstructing at least one of said at least three signals is located; and means for securely transmitting said set of controlling parameters, out-of-band with respect to said output signal, to said remote location, in response to a received request.

8. The invention as described in claim 7 wherein each signal of said plurality is a video signal.

9. The invention as described in claim 8 wherein said portions are frames of said video signals.

10. The invention as described in claim 8 wherein said portions are fields of said video signals.

11. The invention as described in claim 9 wherein said portion boundaries are defined by the vertical retrace intervals of said video signals.

12. The invention as described in claim 10 wherein said portion boundaries are defined by the vertical retrace intervals of said video signals.

13. A system for use scrambling at least three original signals and for reconstructing unscrambled versions of said original signals from at least three scrambled signals containing between them all the information of said three original signals, said original signals and said scrambled signals each being divided into a plurality of portions, said system comprising:

first means responsive to at least a supplied first key variable and a supplied first present internal state for cryptographically generating a first series of portion selection indicators;

at least three signal selectors, each of said at least three signal selectors having at least an input for receiving said original signals and an output, each selector of said plurality being responsive to said first series of portion selection indicators for selecting a portion of one of said original signals to be supplied to its output to create one of said scrambled signals;

at least one other signal selector located at said remote location and having at least an input and an output, said other selector receiving versions of all of said at least three scrambled signals as an input and being responsive to said second series of portion selection indicators for selecting a portion to be supplied to its output from one of said at least three scrambled signals;

at least one communications system for receiving said scrambled signals supplied as outputs by said at least three signal selectors and delivering versions thereof to said at least one other signal selector means for receiving requests for said second key variable and said second present internal state from at least said one remote location; and means for supplying said first key variable and said first present internal state to said first means for cryptographically generating and for supplying, out-of-band with respect to said scrambled signals, in response to a received request said second key variable and said second present internal state to said second means for cryptographically generating at said remote location so that said first series of portion selection indicators and second series of portion selection indicators are identical.

14. The invention as defined in claim 13 wherein each portion selection indicator in said second series of portion selection indicators is delayed a predetermined amount from its corresponding identical portion selection indicator in said first series of portion selection indicators.

15. The invention as described in claim 14 wherein each of said original signals is a video signal.

16. The invention as described in claim 15 wherein said portions are frames of said video signals.

17. The invention as described in claim 15 wherein said portions are fields of said video signals.

18. A method of scrambling at least three input signals to create at least three output signals, said method comprising the steps of:

generating a selection signal cryptographically in response to a set of controlling parameters;

selecting, in response to the selection signal, a portion of each of said at least three input signals;

supplying each selected portion as a part of a respective one of said at least three output signals;

receiving a request for said set of controlling parameters from at least one remote location at which means for reconstructing at least one of said at least three input signals is located; and transmitting said set of controlling parameters to said means for reconstructing, out-of-band with respect to said at least three output signals, in response to a received request.

19. A method of scrambling at least three input video signals to create N output video signals. N being three or greater, said method comprising the steps of:

generating for each of a succession of video frame periods a selection signal having a succession of N elements, each of said elements having a value which identifies a respective different one of said input video signals, the order of the values of said elements within the selection signal being determined cryptographically in response to a set of controlling parameters;

providing to the $i sup th$ output video signal during each frame period a frame from the input video signal identified by the value of the $i sup th$ element of said selection signal i=1, 2, ... ,N receiving a request for said set of controlling parameters from at least one remote location at which means for reconstructing at least one of said at least three input video signals is located; and transmitting said set of controlling parameters out-of-band with respect to each output video signal, to said means for reconstructing, in response to a received request.

20. A method for use in processing at least three signals to obtain an output signal, each signal of said at least three signals being divided into predetermined portions, the method comprising the steps of:

generating a selection signal cryptographically in response to a set of controlling parameters;

selecting portions from each signal of said at least three signals, in response to said selection signal, to obtain said output signal;

receiving a request for said set of controlling parameters from at least one remote location at which means for reconstructing at least one of said at least three signals is located; and transmitting said set of controlling parameters out-of-band with respect to said output signal to said means for reconstructing, in response to a received request.

21. The invention as described in claim 20 wherein each signal of said plurality is a video signal.

22. The invention as described in claim 21 wherein said portions are frames of said video signals.

23. The invention as described in claim 21 wherein said portions are fields of said video signals.

24. A method for use in obtaining an output signal by processing at least three signals that are divided into predetermined portions, the method comprising the steps of:
generating a cryptographic portion selection signal in response to a set of controlling parameters;
selecting portions from each of said at least three signals to obtain said output signal in response to said cryptographic portion selection signal;
receiving a request for said set of controlling parameters from at least one remote location at which means for reconstructing at least one of said at least three signals is located; and
transmitting said set of controlling parameters out-of-band with respect to said output signal to said means for reconstructing, in response to a received request.

25. A method for use in creating an output signal from at least three input signals that are each divided into predetermined portions, the method comprising the steps of:
generating a pseudo-random number sequence in response to a set of controlling parameters;
combining portions of said at least three input signals to create said output signal in response to said pseudo-random number sequence;
receiving a request for said set of controlling parameters from at least one remote location at which means for reconstructing at least one of said at least three signals is located; and
transmitting said set of controlling parameters out-of-band with respect to said output signal to said means for reconstructing, in response to a received request.

26. A method for use in scrambling at least three signals having the same defined format comprising the steps of:
dividing said at least three signals into portions;
developing a series of output values for a cryptographic function, said values being determined by at least a key variable and a present internal state of said cryptographic function;
interspersing said portions among one another so as to create at least three new signals, each of said new signals having said defined format wherein said step of interspersing is characterized by being responsive to the output values of said cryptographic function
receiving a request for said key variable and said present internal state from at least one remote location at which means for reconstructing at least one of said at least three signals is located; and
transmitting said key variable and said present internal state out-of-band with respect to each of said new signals to said means for reconstructing, in response to a received request.

27. The invention as defined in claim 1 wherein said set of controlling parameters includes a key variable and a present internal state of a DES encryption algorithm.

28. The invention as defined in claim 27 wherein said set of controlling parameters includes a session number of one of said at least three signals.

29. The invention as defined in claim 6 wherein said set of controlling parameters includes a key variable and a present internal state of a DES encryption algorithm.

30. The invention as defined in claim 29 wherein said set of controlling parameters includes a session number of one of said at least three input signals.

31. The invention as defined in claim 7 wherein said set of controlling parameters includes a key variable and a present internal state of a DES encryption algorithm.

32. The invention as defined in claim 31 wherein said set of controlling parameters includes a session number of one of said at least three signals.

33. The invention as defined in claim 18 wherein said set of controlling parameters includes a key variable and a present internal state of a DES encryption algorithm.

34. The invention as defined in claim 33 wherein said set of controlling parameters includes a session number of one of said at least three input signals.

35. The invention as defined in claim 20 wherein said set of controlling parameters includes a key variable and a present internal state of a DES encryption algorithm.

36. The invention as defined in claim 35 wherein said set of controlling parameters includes a session number of one of said at least three signals.

37. The invention as defined in claim 26 wherein said set of controlling parameters includes a key variable and a present internal state of a DES encryption algorithm.

38. The invention as defined in claim 37 wherein said set of controlling parameters includes a session number of one of said at least three original signals.

* * * * *